(12) United States Patent
Schuette et al.

(10) Patent No.: US 9,867,503 B2
(45) Date of Patent: Jan. 16, 2018

(54) CHOPPING SYSTEM

(71) Applicant: Spectrum Brands, Inc., Middleton, WI (US)

(72) Inventors: Cassandra Schuette, Middleton, WI (US); James Saunders, Middleton, WI (US); Joseph Krebs, Madison, WI (US); Rolando Cavazos, Middleton, WI (US)

(73) Assignee: Spectrum Brands, Inc., Middleton, WI (US)

( * ) Notice: Subject to any disclaimer, the term of this patent is extended or adjusted under 35 U.S.C. 154(b) by 278 days.

(21) Appl. No.: 14/610,072

(22) Filed: Jan. 30, 2015

(65) Prior Publication Data
US 2015/0216359 A1    Aug. 6, 2015

Related U.S. Application Data

(60) Provisional application No. 61/934,309, filed on Jan. 31, 2014.

(51) Int. Cl.
| | |
|---|---|
| *A47J 43/14* | (2006.01) |
| *A47J 43/044* | (2006.01) |
| *A47J 43/07* | (2006.01) |
| *A47J 43/08* | (2006.01) |
| *B01F 15/00* | (2006.01) |

(52) U.S. Cl.
CPC ......... *A47J 43/044* (2013.01); *A47J 43/0711* (2013.01); *A47J 43/082* (2013.01); *B01F 15/00006* (2013.01); *B01F 15/00844* (2013.01); *A47J 2043/0449* (2013.01)

(58) Field of Classification Search
USPC ............... 366/129; 99/509, 510; 241/282
See application file for complete search history.

(56) References Cited

U.S. PATENT DOCUMENTS

| | | | |
|---|---|---|---|
| 2,715,519 A | 8/1955 | Schwalbe | |
| 3,434,518 A | 3/1969 | Motis | |
| 4,111,372 A * | 9/1978 | Hicks ................. | A47J 43/0772 241/282.1 |

(Continued)

OTHER PUBLICATIONS

ISR/WO of PCT/US15/13858 dated Apr. 23, 2015, 13 pages.
Supplementary European Search Report for co-pending EP15743199, 3 pages, dated Oct. 9, 2017.

*Primary Examiner* — Nina Bhat
(74) *Attorney, Agent, or Firm* — Kagan Binder, PLLC

(57) ABSTRACT

A chopping system generally includes a container having a bottom wall and a sidewall together defining a cavity. The sidewall has a rim, and the bottom wall has an upper surface with a central area having an entirely smooth contour. The system also includes a drive assembly configured for mounting on the rim to cover the cavity, and the system further includes a working assembly comprising at least one working member configured for operative attachment to the drive assembly such that, when the drive assembly is mounted on the rim, the working member is disposed within the cavity. The system further includes a base attached to the working assembly such that the working member is rotatable relative to the base. The base has a bottom surface that substantially mirrors the contour of the upper surface within the central area so as to be seated substantially flush thereagainst.

20 Claims, 4 Drawing Sheets

(56) References Cited

U.S. PATENT DOCUMENTS

| | | | | |
|---|---|---|---|---|
| 4,285,473 | A | * | 8/1981 | Williams .............. A47J 43/046 188/166 |
| 4,387,860 | A | * | 6/1983 | Necas ................... A47J 43/044 241/282.1 |
| 5,469,782 | A | * | 11/1995 | Wong ...................... A47J 27/14 99/352 |
| 6,089,746 | A | * | 7/2000 | Martin .................. A47J 43/044 366/129 |
| 6,155,161 | A | * | 12/2000 | Chan ....................... A47J 36/16 366/146 |
| 6,193,181 | B1 | | 2/2001 | Astegno et al. |
| 6,634,580 | B2 | | 10/2003 | Obersteiner |
| 6,641,298 | B2 | | 11/2003 | Savont et al. |
| 2004/0046075 | A1 | | 3/2004 | Gursel |
| 2007/0200018 | A1 | | 8/2007 | Leung et al. |
| 2007/0263482 | A1 | * | 11/2007 | Stephens ................. A47J 36/20 366/145 |
| 2012/0091245 | A1 | * | 4/2012 | Menashes ........... A47J 43/0722 241/282.1 |
| 2014/0299694 | A1 | * | 10/2014 | Zakowski ........... A47J 43/0716 241/100 |
| 2015/0164279 | A1 | * | 6/2015 | Ryan .................... A47J 43/044 366/279 |

* cited by examiner

CHOPPING SYSTEM

CROSS-REFERENCE TO RELATED APPLICATIONS

This application claims the benefit of U.S. Provisional Application No. 61/934,309 filed on Jan. 31, 2014, which is incorporated by reference herein in its entirety.

BACKGROUND

The field of this disclosure relates generally to household appliances and, more particularly, to an appliance for chopping food.

At least some known chopping appliances include a bowl having a base surface that includes an opening defined therethrough, and a spindle guide that extends through the opening. In such an arrangement, chopped food may leave the bowl through the opening. To facilitate controlling an amount of food that leaves the bowl, at least some known bowls have a max-fill line that is no higher than a top of the spindle guide. This, however, limits the amount of food that can be placed in the bowl. To facilitate increasing a capacity of the bowl and/or controlling the amount of food that leaves the bowl, at least some known choppers include a bowl that has a base surface having a spindle guide integrally formed therewith. In such an arrangement, the spindle guide protrudes upward, limiting a functionality of the bowl as a stand-alone bowl.

BRIEF DESCRIPTION

In one aspect, a chopping system generally includes a container having a bottom wall and a sidewall together defining a cavity. The sidewall has a rim, and the bottom wall has an upper surface with a central area having an entirely smooth contour. The system also includes a drive assembly configured for mounting on the rim of the container to cover the cavity, and the system further includes a working assembly comprising at least one working member configured for operative attachment to the drive assembly such that, when the drive assembly is mounted on the rim of the container, the working member is disposed within the cavity of the container. The system further includes a base attached to the working assembly such that the working member is rotatable relative to the base. The base has a bottom surface that substantially mirrors the contour of the upper surface of the bottom wall of the container within the central area so as to be seated substantially flush thereagainst.

In another aspect, a chopping system having a container with a sidewall and a bottom wall that together define a cavity generally comprises a working assembly comprising a drive shaft and a working member extending outward from the drive shaft. The chopping system further comprises a base attached to the working assembly such that the working assembly is rotatable relative to the base. The base comprises a platform having a bottom surface configured for seating on the bottom wall of the container and contoured such that at least substantially the whole bottom surface is flat and is oriented substantially perpendicular to the drive shaft.

In yet another aspect, a chopping system generally comprises a container fabricated from oven-safe, tempered glass and having a bottom wall and a sidewall together defining a cavity. The sidewall has a rim, and the bottom wall has an upper surface with a central area having an entirely smooth contour. The sidewall tapers toward the bottom wall such that the cavity has a greater diameter at the rim than at the bottom wall. The system also comprises a drive assembly configured for mounting on the rim of the container to cover the cavity, and the drive assembly comprises a motor. The system further comprises a working assembly including a drive shaft configured for operative attachment to the motor so as to be rotatable by the motor, and the working assembly comprises a pair of blades attached to the drive shaft such that, when the drive assembly is mounted on the rim of the container with the drive shaft attached to the motor, the drive shaft extends into the cavity substantially perpendicular to the bottom wall of the container to dispose the blades within the cavity of the container. The blades extend substantially radially outward from the drive shaft in different directions and at different elevations. The system further comprises a base attached to the working assembly such that the drive shaft and the blades are rotatable relative to the base. The base has a platform with a plurality of legs emanating radially outward away from one another such that each pair of adjacent legs is connected by a web to form a webbed star shape. The platform has a bottom surface that substantially mirrors the contour of the upper surface of the bottom wall of the container within the central area so as to be seated substantially flush thereagainst.

DRAWINGS

Corresponding reference characters indicate corresponding parts throughout the several views of the drawings.

DETAILED DESCRIPTION

Figure 1:
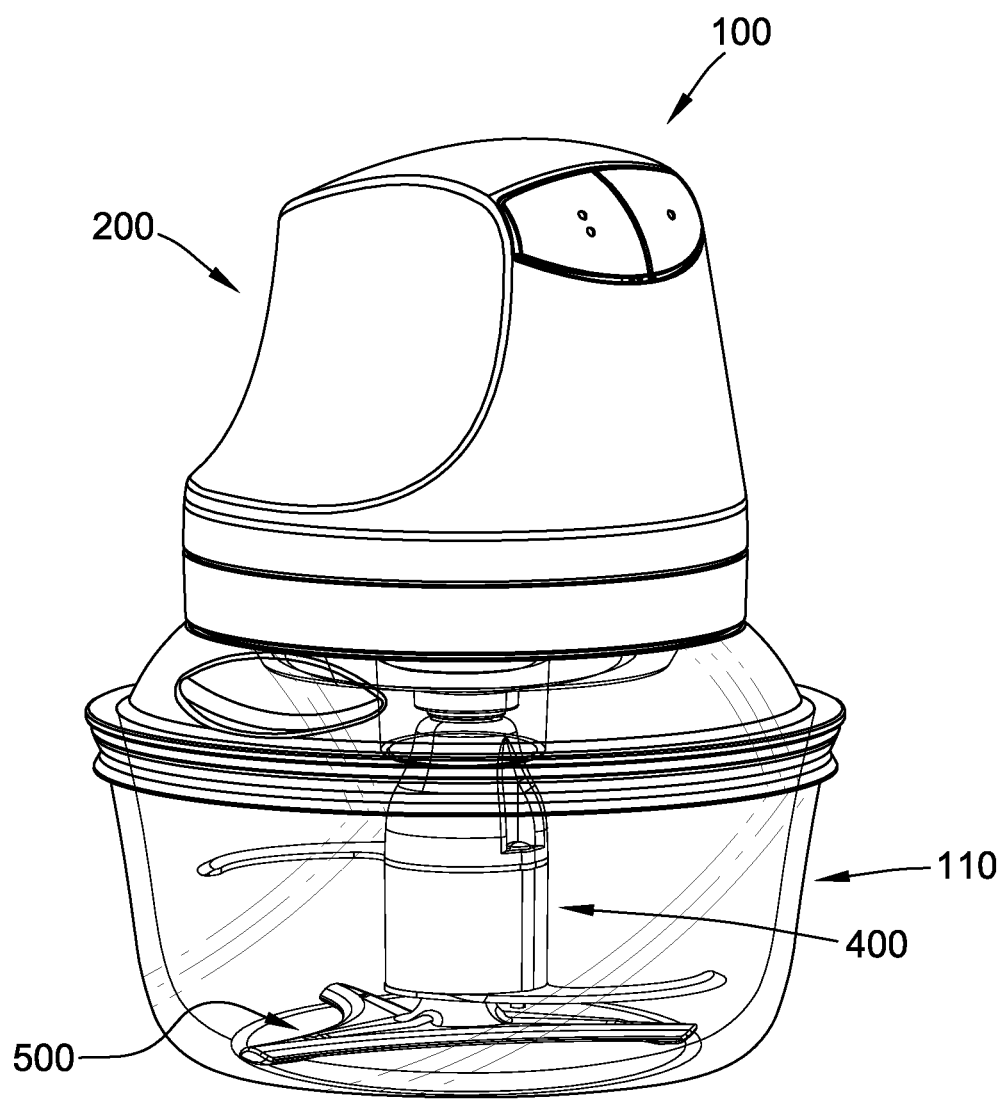
FIG. 1 is a perspective view of an exemplary chopping system.
Figure 2:
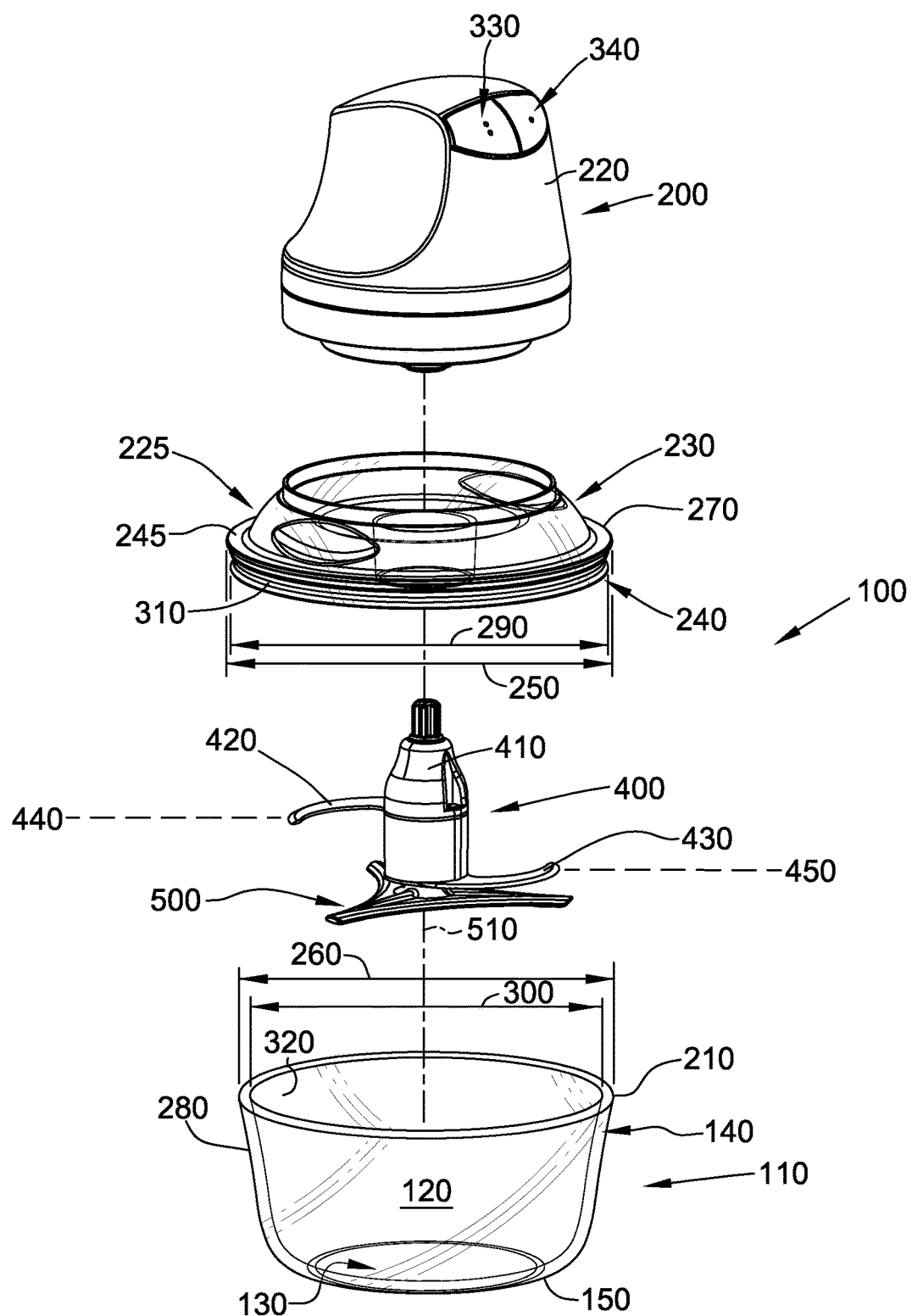
FIG. 2 is an exploded view of the chopping system shown in FIG. 1.

FIGS. 1 and 2 illustrate one embodiment of a chopping system 100 suitably configured for chopping food. It is understood, however, that in other embodiments the chopping system 100 and the various components thereof may be configured and/or used for processing, stirring, crushing, blending, grinding, and/or shredding any suitable matter and remain within the scope of this invention.

The chopping system 100 includes a container 110 defining a cavity 120 therein. In the exemplary embodiment, the container 110 is generally bowl-shaped and includes a bottom wall 130 and a sidewall 140 that extends about the bottom wall 130 to at least partially define the cavity 120. The container 110 is suitably sized and configured to chop food within the cavity 120. In the exemplary embodiment, the bottom wall 130 has a lower surface 150 for positioning the container 110 on a support structure, such as a countertop. Alternatively, the container 110 may have any shape and/or size that enables the container 110 to function as described herein.

In the exemplary embodiment, the container 110 is fabricated from a tempered glass (e.g., PYREX® glass from Corning Incorporated Corporation) that is shatter-proof, oven-safe, microwave-safe, and/or dishwasher-safe. Alternatively, the container 110 may be fabricated from any other food-safe material (such as, for example, glass, polyethylene, polypropylene, and/or silicone) that enables the container 110 to function as described herein.

The chopping system 100 further includes a drive assembly 200 coupleable to a rim 210 or, more broadly, an upper portion of the container 110 such that the container 110 is at least partially sealed when the drive assembly 200 is coupled to the rim 210. In the exemplary embodiment, the drive assembly 200 includes a housing 220 that houses a drive mechanism or motor 660 (shown in FIG. 4), and an adapter 225 that is coupleable to the housing 220. In the exemplary embodiment, the adapter 225 includes an outer rim portion 230 and an inner rim portion 240.

In the exemplary embodiment, the outer rim portion 230 is positionable on the rim 210 of the container 110 and includes a flange 245 extending radially outward. In the exemplary embodiment, the flange 245 has a first diameter 250 that is greater than an outer diameter 260 of the sidewall 140 such that the outer surface 270 of the outer rim portion 230 extends or hangs over an outer surface 280 of the sidewall 140 when the outer rim portion 230 is positioned on the rim 210 of the container 110.

In the exemplary embodiment, the inner rim portion 240 has a second diameter 290 that is less than the first diameter 250 and enables the inner rim portion 240 to be positioned within the cavity 120 when the outer rim portion 230 is positioned on the rim 210 of the container 110. In the exemplary embodiment, the second diameter 290 is substantially similar to an inner diameter 300 of the sidewall 140 at rim 210 such that an outer surface 310 of the inner rim portion 240 engages an inner surface 320 of the sidewall 140 when the inner rim portion 240 is positioned within the cavity 120.

In the exemplary embodiment, the drive assembly 200 includes a plurality of buttons 330 and 340 that control an operation of the drive assembly 200. For example, in one embodiment, the first button 330 is configured to operate the motor 660 at a higher revolutions-per-minute setting (or, more broadly, a first setting), and the second button 340 is configured to operate the motor 660 at a lower revolutions-per-minute setting (or, more broadly, a second setting). Alternatively, the drive assembly 200 may include any type of control panel including any number of buttons that enables the drive assembly 200 to function as described herein.

The chopping system 100 further includes a working assembly 400 that is coupleable to the drive assembly 200 such that the working assembly 400 is positioned within the cavity 120 when the outer rim portion 230 is positioned on the rim 210 of the container 110. In the exemplary embodiment, the working assembly 400 includes a drive shaft 410 that is coupleable to the drive assembly 200 such that the working assembly 400 is configured to rotate as the motor 660 of the drive assembly 200 is actuated and/or rotated. In the exemplary embodiment, the drive shaft 410 and the drive assembly 200 are keyed such that the working assembly 400 is configured to rotate with the motor 660. Alternatively, the working assembly 400 may engage the drive assembly 200 in any manner that enables the chopping system 100 to function as described herein.

The working assembly 400 includes a first blade 420 and a second blade 430 or, more broadly, at least one working member extending generally radially outward from the drive shaft 410. In the exemplary embodiment, the first blade 420 is curved and extends radially outward in a first direction, and the second blade 430 is curved and extends radially outward in a second direction opposite the first direction. The first blade 420 is positioned at a first elevation 440 of the working assembly 400, and the second blade 430 is positioned at a second elevation 450 of the working assembly 400 different from the first elevation 440. Alternatively, the working assembly 400 may include any number and/or type of working members in any arrangement and/or configuration that enables the working assembly 400 to function as described herein.

The chopping system 100 further includes a base 500 positionable within the container 110. The working assembly 400 is rotatably coupled to the base 500, such that the first blade 420 and/or the second blade 430 is rotatable about a center (or vertical) axis 510 of the system 100. That is, the base 500 is configured to remain substantially stationary as the working assembly 400 is rotated about the center axis 510. In at least some embodiments, the working assembly 400 is securely coupled to the base 500 such that the working assembly 400 and the base 500 are conjointly removable from the container 110 along with the drive assembly 200 and/or are conjointly detachable from the drive assembly 200.

Figure 3:
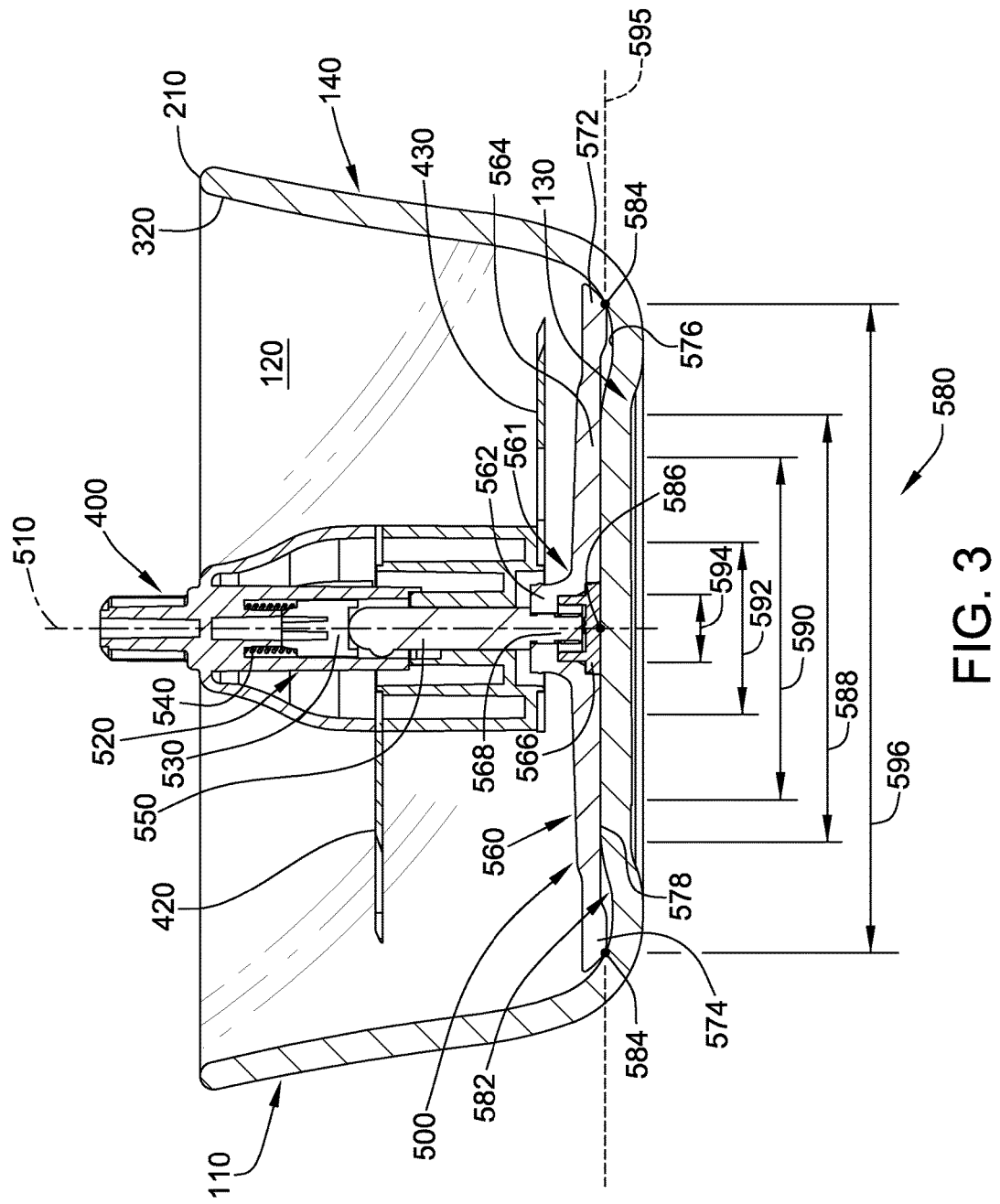
FIG. 3 is a cross-sectional view of a portion of the chopping system shown in FIGS. 1 and 2.

FIG. 3 is a cross-sectional view of the working assembly 400 and the base 500 disposed within the container 110. The working assembly 400 and/or the base 500 includes a dampening mechanism 520 configured to control and/or dampen a movement and/or vibration of the blades 420 and/or 430 with respect to the base 500. For example, the dampening mechanism 520 may inhibit a high vibration caused by a tolerance stack-up. In the exemplary embodiment, the dampening mechanism 520 includes a captive pin 530 and a spring-loaded mechanism 540 coupled to the captive pin 530. Alternatively, the dampening mechanism 520 may include any combination of components in any arrangement and/or configuration that enables the working assembly 400 and/or the base 500 to function as described herein.

The base 500 includes a shaft 550 extending along the center axis 510, and a platform 560 having a body 561 attached to the shaft 550. The body 561 includes a hub 562 that receives the shaft 550, and a plurality of legs 564 that emanate generally radially outward from the hub 562. The hub 562 and the legs 564 are integrally formed together in the exemplary embodiment, and the platform 560 further includes a cap 566 formed separately from and coupled to the body 561 centrally between the legs 564. In this manner, the cap 566 covers the tip 568 of the shaft 550 from underneath when the shaft 550 is inserted into the hub 562 such that the tip 568 is not accessible from underneath the platform 560. Notably, the body 561 and the cap 566 are conjointly removable from the container 110 along with the remainder of the base 500. However, while the cap 566 is formed separately from the body 561 in the exemplary embodiment, the cap 566 may be formed integrally with the body 561 in other suitable embodiments.

Figure 4:
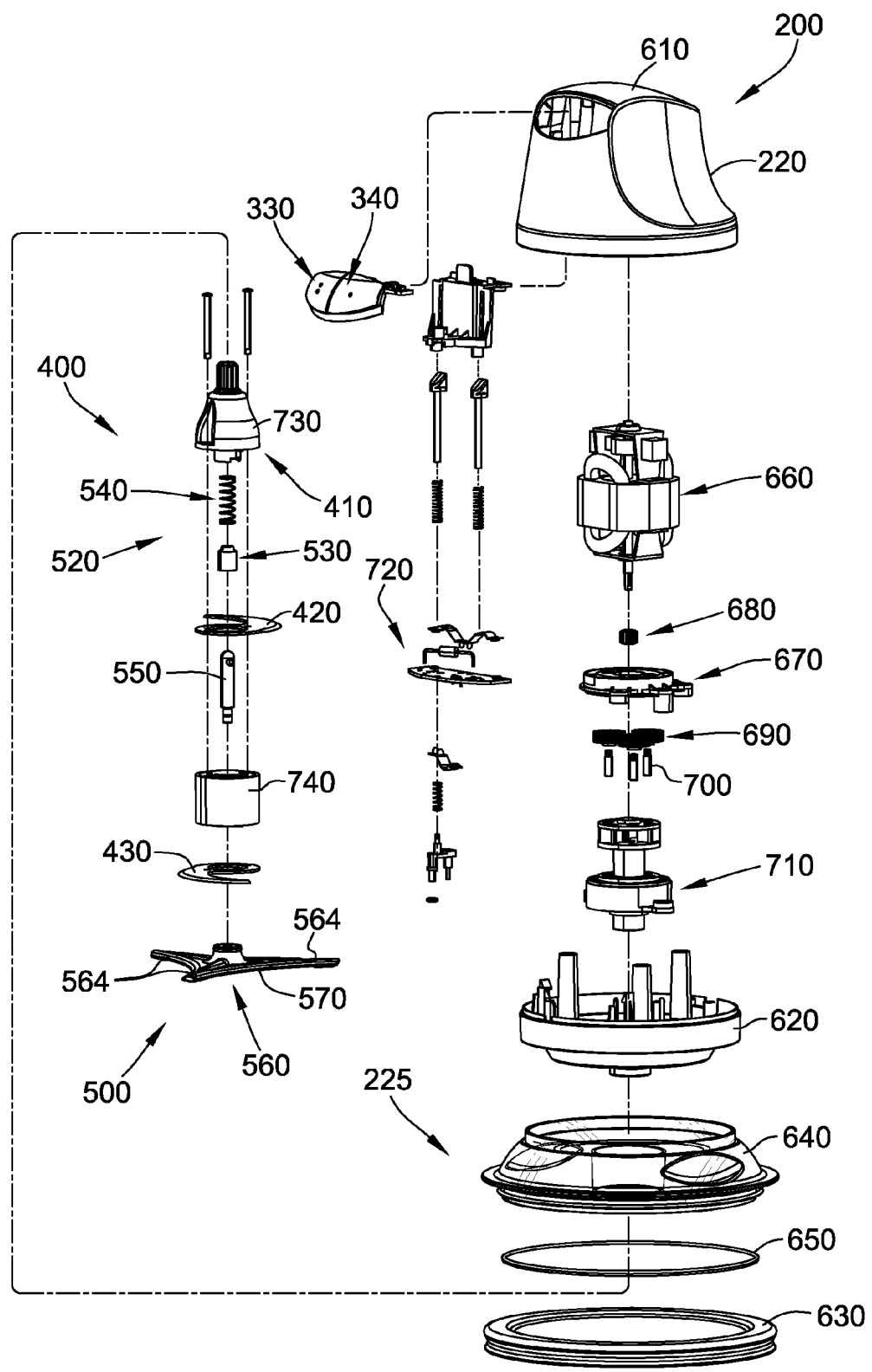
FIG. 4 is an exploded view of a portion of the chopping system shown in FIGS. 1 and 2.

As shown in FIG. 4, the exemplary platform 560 has three legs 564 that are angularly spaced apart from one another by about 120°, and each pair of adjacent legs 564 is connected together by a web 570 such that the platform 560 is shaped like a webbed, three-pointed star. Referring back to FIG. 3, in the exemplary embodiment, each leg 564 has a distal end 572 and a thickened region (or foot) 574 formed on the bottom of the distal end 572 to assist the platform 560 in better gripping the upper surface 576 of the bottom wall 130, as set forth in more detail below. Suitably, the platform 560 (e.g., the legs 564 and/or the cap 566) is fabricated from a hard plastic that inhibits movement and/or slipping of the platform 560 on the upper surface 576 of the bottom wall 130, such that the platform 560 is generally stationary with respect to the container 110 during operation of the system 100. To further this purpose, the platform 560 may optionally include a soft silicone overmold on at least the bottom surface 578 thereof. Alternatively, in other embodiments, the platform 560 may have any suitable number of legs 564 with any suitable shape, arranged in any suitable manner, and fabricated from any suitable material that enables the platform 560 to function as described herein (e.g., in one contemplated embodiment, the platform 560 may not have any legs 564 but, rather, may have an annular outer extent so as to be shaped like a disc instead of a webbed, three-pointed star).

Referring now to the container 110 in particular, in the exemplary embodiment, the inner surface 320 of the sidewall 140 tapers toward the bottom wall 130 from the rim 210 such that the cavity 120 of the container 110 has a greater diameter at the rim 210 than at the bottom wall 130. In this manner, the sidewall 140 of the container 110 acts as a guide for proper insertion of the platform 560 into the container 110, directing the platform 560 into its proper placement on the bottom wall 130 as the platform 560 is inserted into the cavity 120. Suitably, in other embodiments, the sidewall 140 of the container 110 may be shaped in any manner that enables the container 110 and the base 500 to function as described herein (e.g., the sidewall 140 may be substantially the same diameter at the rim 210 as at the bottom wall 130 such that the sidewall 140 takes on a substantially cylindrical shape, as opposed to the tapered shape of the exemplary embodiment).

Notably, the upper surface 576 of the bottom wall 130 of the container 110 has a center point 586 and an entirely smooth contour throughout a central area 580 that encompasses the center point 586. While in the exemplary embodiment the contour of the central area 580 is altogether substantially flat (or planar) and is oriented substantially perpendicular to the center axis 510, the central area 580 may in other suitable embodiments have a contour that is somewhat concave and/or convex. In the exemplary embodiment, the central area 580 is the whole area defined within an annular boundary 588 located at the radially inner extent of an annular groove 582 situated near the junction 584 (i.e., near the center of the surface fillet arc length) between the inner surface 320 of the sidewall 140 and the upper surface 576 of the bottom wall 130. In one suitable embodiment, however, the annular groove 582 may not be present on the container 110, and the central area 580 may instead have an annular boundary 596 that spans the whole upper surface 576 radially outward from the center point 586 to the junction 584. In another suitable embodiment, the central area 580 is the whole area defined within an annular boundary 590, which is located radially outward about halfway from the center point 586 to the junction 584. In some suitable embodiments, the central area 580 is the whole area defined within an annular boundary 592, which is located radially outward about a quarter of the way from the center point 586 to the junction 584. In other suitable embodiments, the central area 580 is the whole area defined within an annular boundary 594, which is located radially outward about a tenth of the way from the center point 586 to the junction 584. Alternatively, the central area 580 may have any suitable boundary that facilitates enabling the container 110 and the base 500 to function as described herein.

As used herein, a container 100 is said to have a bottom wall 130 with an upper surface 576 having a contour that is "entirely smooth" if the upper surface 576 does not have any drastic change(s) in slope therealong (such as, for example, a segment of the upper surface 576, or an object projecting through the upper surface 576, that is sloped steeper than about ±45° relative to a horizontal axis 595 perpendicular to a center axis 510 of the container 100) that is/are configured to locate or stabilize the horizontal position of a rotatable chopping tool relative to the upper surface 576. In accordance with this definition, an upper surface contour would still be considered "entirely smooth" even if it is textured such as, for example, with low-level bumps, recesses, ridges, or grooves configured to serve an ornamental branding purpose, a food non-stick purpose, a liquid channeling purpose, etc.

With the container 110 configured in such a manner, the container 110 is much more versatile in its application outside of its use in the electric chopping system 100 described herein. In other words, because the central area 580 of the bottom wall 130 has an entirely smooth contour, the container 110 is more suitable for use in applications where such a feature is desirable (e.g., when mixing food products together using an electric, handheld mixer, given that drastic changes in the contour along the upper surface 576 of the bottom wall 130 can interfere with and damage the whisk attachment of the handheld mixer).

Moreover, the entirely smooth contour makes the container 110 more appealing to the eye when used in applications outside of the electric chopping system 100 described herein. More specifically, a container having a bottom wall 130 that is obviously contoured or configured for locating or stabilizing a rotatable chopping tool can look somewhat out of place when used for other, more mainstream applications such as food storage or food serving applications. In that regard, with the container 110 having an entirely smooth contour throughout its central area 580, it is not as obvious from the appearance of the container 110 that the container 110 is suitable for use in the electric chopping system 100, given the container's lack of drastic contour changes that would otherwise indicate such suitability. In this manner, the appearance of the container 110 helps the user feel more comfortable using the container 110 in applications other than electric chopping system applications.

Referring again to the configuration of the base 500, in the exemplary embodiment, the legs 564 and the cap 566 collectively define the bottom surface 578 of the platform 560, and the bottom surface 578 is contoured to seat substantially flush against (i.e., substantially without open space or gaps between) the central area 580 of the upper surface 576 of the bottom wall 130. More specifically, the bottom surface 578 of the platform 560 is contoured to substantially mirror the shape of the central area 580 of the upper surface 576 of the bottom wall 130. As such, in the exemplary embodiment, substantially the whole bottom surface 578 is flat (or planar) and is oriented substantially perpendicular to the center axis 510. However, in order to substantially mirror the shape of the whole, entirely smooth central area 580 in other embodiments, the bottom surface 578 is to be suitably made flat where (and to substantially the same degree that) the upper surface 576 in the central area 580 is flat; the bottom surface 578 is to be made concave where (and to substantially the same degree that) the upper surface 576 in the central area 580 is convex; and the bottom surface 578 is to be made convex where (and to substantially the same degree that) the upper surface 576 in the central area 580 is concave. Notably, in the exemplary embodiment, the legs 564 extend radially beyond the annular boundary 588 of the central area 580 such that the feet 574 of the legs 564 fit into the groove 582 to assist the platform 560 in gripping the upper surface 576 of the bottom wall 130.

Suitably, the legs 564 may not have the feet 574 in some embodiments, just as the bottom wall 130 of the container 110 may not have the groove 582 in some embodiments.

FIG. 4 is an exploded view of the drive assembly 200, the working assembly 400, and the base 500. In the exemplary embodiment, the housing 220 of the drive assembly 200 includes an upper housing portion 610 and a lower housing portion 620 coupleable to the upper housing portion 610. In the exemplary embodiment, the adapter 225 of the drive assembly 200 includes an adapter body 640 coupleable to the lower housing portion 620 and to the rim 210, and a seal 650 that enables the rim 210 to be at least partially sealed when the adapter 225 is coupled to the rim 210. Alternatively, the drive assembly 200 may include any number of components arranged in any manner that facilitates enabling the drive assembly 200 to function as described herein. Additionally or alternatively, a cover 630 is also coupleable to the rim 210 to at least partially seal the container 110 when the drive assembly 200 is not coupled to the rim 210.

The housing 220 houses the drive mechanism or motor 660 mounted on a motor bracket 670. In the exemplary embodiment, the motor 660 is configured to engage and rotate a sun gear 680, which is configured to engage and rotate a plurality of planetary gears 690. In the exemplary embodiment, each planetary gear 690 is configured to engage and rotate a respective drive shaft 700, which are configured to engage and rotate an internal gear 710. Accordingly, in the exemplary embodiment, the motor 660 is configured to rotate the internal gear 710 via the sun gear 680 and planetary gears 690. In the exemplary embodiment, the internal gear 710 is keyed and configured to engage the drive shaft 410 of the working assembly 400 such that the working assembly 400 is configured to rotate with the motor 660. Alternatively, the motor 660 may be configured to engage or rotate any combination of gears and/or shafts that enables the chopping system 100 to function as described herein. In the exemplary embodiment, the housing 220 houses a printed circuit board 720 that enables the buttons 330 and 340 to control an operation of the drive assembly 200.

In the exemplary embodiment, the drive shaft 410 includes an upper portion 730 and a lower portion 740. In the exemplary embodiment, the lower portion 740 is positioned between the first blade 420 and the second blade 430 to provide a separation between the blades 420 and 430.

During operation of the system 100, the drive assembly 200 rotates the working assembly 400 within the cavity 120 relative to the base 500 such that a food product and/or other contents of the container 110 may be chopped and/or otherwise processed, and the base 500 functions to locate and stabilize the working assembly 400 within the cavity 120 as the working assembly 400 rotates. After chopping the food product, the drive assembly 200, the working assembly 400, and the base 500 are to be uncoupled from the container 110, the food product may however remain in the container 110 for cooking and/or further processing of the food product in the container 110. Additionally or alternatively, the cover 630 may be coupled to the rim 210 of the container 110, and the food product may then be stored in the container 110.

In at least some embodiments, multiple containers 110 may be provided with the chopping system 100, in the form of a kit. For example, a user may: (1) couple a first container 110 to the drive assembly 200, the working assembly 400, and the base 500 for use in chopping a first food product; and then (2) remove the first container 110 and attach a second container 110 to the drive assembly 200, the working assembly 400, and the base 500 for chopping a second food product (e.g., the first container 110 may be used to make salsa with the chopping system 100, and then the second container 110 may be used to make guacamole with the chopping system 100). This permits use of the chopping system 100 to prepare a full meal without having to empty and/or clean as many containers 110 while preparing a meal. Notably, any suitable number of containers 110 may be provided in the kit.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus and methods without departing from the scope of the disclosure, it is intended that all matter contained in the above description and shown in the accompanying figures shall be interpreted as illustrative and not in a limiting sense.

What is claimed is:

1. A chopping system comprising:
   a container having a bottom wall and a sidewall together defining a cavity, wherein the sidewall has a rim and wherein the bottom wall has an upper surface with a central area having an entirely smooth contour;
   a drive assembly configured for mounting on the rim of the container to cover the cavity;
   a working assembly comprising at least one working member configured for operative attachment to the drive assembly such that, when the drive assembly is mounted on the rim of the container, the working member is disposed within the cavity of the container; and
   a base attached to the working assembly such that the working member is rotatable relative to the base, wherein the base has a bottom surface that substantially mirrors the contour of the upper surface of the bottom wall of the container within the central area so as to be seated substantially flush against the bottom wall of the container without substantial open space or gaps between the base bottom surface and the upper surface the central area of the bottom wall of the container.

2. The chopping system of claim 1, wherein the contour of the upper surface within the central area is flat without substantial contour.

3. The chopping system of claim 1, wherein the base has a platform with a plurality of legs emanating outward away from one another, the legs extending to the sidewall at plural locations for centering the working assembly within the container.

4. The chopping system of claim 3, wherein the platform has three legs.

5. The chopping system of claim 4, wherein each adjacent pair of legs is joined together by an arcuate web such that the platform has a webbed, three-pointed star shape.

6. The chopping system of claim 1, wherein the container is fabricated from oven-safe, tempered glass.

7. The chopping system of claim 1, wherein the base has a platform fabricated from a hard plastic, and wherein the bottom surface of the base is defined by a soft silicone overmold of the hard plastic.

8. The chopping system of claim 1, wherein the working assembly comprises a drive shaft configured to extend into the cavity substantially perpendicular to the bottom wall of the container, and wherein the working member extends outward from the drive shaft.

9. The chopping system of claim 8, wherein the working member comprises a pair of blades extending outward from the drive shaft in different directions.

10. The chopping system of claim 8, wherein the working member comprises a pair of blades extending outward from the drive shaft at different elevations.

11. The chopping system of claim 1, further comprising a plurality of the containers that are interchangeable with one another for use with the drive assembly, the working assembly, and the base.

12. The chopping system of claim 1, wherein the working assembly is attached to the base by a spring-loaded dampening system.

13. The chopping system of claim 1, further comprising a cover that is coupleable to the rim of the container to at least partially seal the container when the drive assembly is not mounted on the rim.

14. A chopping system having a container with a sidewall and a bottom wall that together define a cavity, the chopping system comprising:
- a working assembly comprising a drive shaft and a working member extending outward from the drive shaft; and
- a base attached to the working assembly such that the working assembly is rotatable relative to the base, wherein the base comprises a platform having a bottom surface configured for seating on the bottom wall of the container and contoured such that at least substantially the whole bottom surface is flat so as to seat substantially flush against an upper surface of the bottom wall of the container without substantial open space or gaps between the base bottom surface and the upper surface the central area of the bottom wall of the container and wherein the bottom surface of the platform of the base is oriented substantially perpendicular to the drive shaft.

15. The chopping system of claim 14, wherein the platform has a plurality of legs, the legs extending to the sidewall at plural locations for centering the working assembly within the container.

16. The chopping system of claim 15, wherein the platform has three legs, and wherein each adjacent pair of legs is connected together by an arcuate web such that the platform is in the shape of a webbed, three-pointed star.

17. The chopping system of claim 14, wherein the platform is fabricated from a hard plastic material.

18. The chopping system of claim 17, wherein the bottom surface of the platform is defined by a soft silicone overmold of the hard plastic material.

19. The chopping system of claim 14, wherein the working assembly is attached to the base by a spring-loaded dampening system.

20. A chopping system comprising:
- a container fabricated from oven-safe, tempered glass and having a bottom wall and a sidewall together defining a cavity, wherein the sidewall has a rim and wherein the bottom wall has an upper surface with a central area having an entirely smooth contour, the sidewall tapering toward the bottom wall such that the cavity has a greater diameter at the rim than at the bottom wall;
- a drive assembly configured for mounting on the rim of the container to cover the cavity, wherein the drive assembly comprises a motor;
- a working assembly comprising a drive shaft configured for operative attachment to the motor so as to be rotatable by the motor, and a pair of blades attached to the drive shaft such that, when the drive assembly is mounted on the rim of the container with the drive shaft attached to the motor, the drive shaft extends into the cavity substantially perpendicular to the bottom wall of the container to dispose the blades within the cavity of the container, wherein the blades extend substantially radially outward from the drive shaft in different directions and at different elevations; and
- a base attached to the working assembly such that the drive shaft and the blades are rotatable relative to the base, wherein the base has a platform with a plurality of legs emanating radially outward away from one another such that each pair of adjacent legs is connected by a web to form a webbed star shape, and wherein the platform has a bottom surface that substantially mirrors the contour of the upper surface of the bottom wall of the container within the central area so as to be seated substantially flush against the bottom wall of the container without substantial open space or gaps between the base bottom surface and the upper surface the central area of the bottom wall of the container.

* * * * *